United States Patent
Kotteri et al.

(10) Patent No.: US 10,467,088 B2
(45) Date of Patent: Nov. 5, 2019

(54) AUDIO SYSTEM MAINTENANCE USING SYSTEM CALL MONITORING

(71) Applicant: Microsoft Technology Licensing, LLC, Redmond, WA (US)

(72) Inventors: Kishore A. Kotteri, Sammamish, WA (US); Firoz Dalal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 15/427,970

(22) Filed: Feb. 8, 2017

(65) Prior Publication Data
US 2018/0225169 A1    Aug. 9, 2018

(51) Int. Cl.
*G06F 11/07*    (2006.01)
*G06F 11/30*    (2006.01)
*G06F 11/34*    (2006.01)

(52) U.S. Cl.
CPC ........ *G06F 11/0793* (2013.01); *G06F 11/079* (2013.01); *G06F 11/0736* (2013.01); *G06F 11/0751* (2013.01); *G06F 11/302* (2013.01); *G06F 11/3013* (2013.01); *G06F 11/3495* (2013.01)

(58) Field of Classification Search
CPC .............................. G06F 11/07; G06F 11/0793
USPC .......................................................... 714/15
See application file for complete search history.

(56) References Cited

U.S. PATENT DOCUMENTS

| | | | |
|---|---|---|---|
| 7,093,014 B2 | 8/2006 | Nino et al. | |
| 7,840,691 B1 | 11/2010 | De Bonet et al. | |
| 7,903,579 B2 | 3/2011 | Hughes et al. | |
| 8,130,916 B2 * | 3/2012 | Lynch | H04M 1/24 379/88.04 |
| 8,358,659 B2 | 1/2013 | Lingafelt et al. | |
| 8,559,320 B2 | 10/2013 | Khanduri | |
| 8,625,767 B2 | 1/2014 | Byrne et al. | |
| 8,885,457 B2 | 11/2014 | Kadakia et al. | |

(Continued)

FOREIGN PATENT DOCUMENTS

| | | |
|---|---|---|
| CA | 2365427 | 6/2003 |
| CN | 105872897 | 8/2016 |

(Continued)

OTHER PUBLICATIONS

"Audio Endpoint Builder Algorithm", Retrieved from https://msdn.microsoft.com/enus/windows/hardware/drivers/audio/audio-endpoint-builder-algorithm, Apr. 20, 2017, 6 Pages.

(Continued)

*Primary Examiner* — Kamini B Patel
(74) *Attorney, Agent, or Firm* — Klarquist Sparkman, LLP (57) ABSTRACT

In a computer system that provides for automatic detection and correction of audio system performance issues, an interface receives calls from audio applications for services of the audio system. An audio capture/playback manager executes the calls. A performance monitor tracks the execution of the calls. A rules store maintains one or more rules, each defining criteria for execution of a type of call for audio system services and a corrective action to be taken if the performance monitor indicates the criteria are not met. In this way, performance issues with the audio system can be quickly detected and corrected without user intervention.

7 Claims, 6 Drawing Sheets

(56) References Cited

U.S. PATENT DOCUMENTS

| | | | |
|---|---|---|---|
| 9,152,374 B2* | 10/2015 | Dantrey | G06F 3/165 |
| 9,319,792 B1* | 4/2016 | Coleman | H04R 3/12 |
| 2002/0133354 A1* | 9/2002 | Ross | G10L 15/1822 |
| | | | 704/275 |
| 2002/0147840 A1 | 10/2002 | Mutton et al. | |
| 2003/0212788 A1* | 11/2003 | Wilding | G06F 11/0715 |
| | | | 709/224 |
| 2007/0112563 A1* | 5/2007 | Krantz | G10L 25/69 |
| | | | 704/216 |
| 2007/0286351 A1 | 12/2007 | Ethier et al. | |
| 2013/0067050 A1* | 3/2013 | Kotteri | H04L 65/60 |
| | | | 709/223 |
| 2013/0090922 A1 | 4/2013 | Lim et al. | |
| 2013/0171987 A1 | 7/2013 | Sterman et al. | |
| 2014/0052438 A1* | 2/2014 | Yerrace | G06F 3/162 |
| | | | 704/201 |
| 2014/0115479 A1 | 4/2014 | Wang et al. | |
| 2014/0365408 A1* | 12/2014 | Snyder | G06N 99/005 |
| | | | 706/12 |
| 2015/0139616 A1* | 5/2015 | Lindroos | H04N 7/163 |
| | | | 386/285 |
| 2016/0285752 A1 | 9/2016 | Joshi | |

FOREIGN PATENT DOCUMENTS

| | | |
|---|---|---|
| EP | 1622349 | 2/2006 |
| WO | WO 2012/056198 | 5/2012 |
| WO | WO 2013/000218 | 1/2013 |

OTHER PUBLICATIONS

"Audio Graphs", Retrieved from https://msdn.microsoft.com/en-us/windows/uwp/audio-video-camera/audio-graphs, Feb. 8, 2017, 21 Pages.

"Audio Processing Object Architecture", Retrieved from https://msdn.microsoft.com/enus/windows/hardware/drivers/audio/audio-processing-object-architecture, Apr. 20, 2017, 10 Pages.

"Audio Signal Processing Modes", Retrieved from https://msdn.microsoft.com/en-us/windows/hardware/drivers/audio/audio-signal-processing-modes, May 14, 2018, 18.

"AudioCaptureRaw Walkthrough: C++", Retrieved from http://web.archive.org/web/20110903013346/http://research.microsoft.com/en-us/um/redmond/projects/kinectsdk/docs/AudioCaptureRaw_Walkthrough.pdf, Sep. 3, 2011, 12 Pages.

"AudioGraph Class", Retrieved from https://msdn.microsoft.com/library/windows/apps/dn914176, Retrieved from Retrieved on Jan. 30, 2017, 6 Pages.

"AudioGraph.CreateSubmixNode() / CreateSubmixNode() Method", Retrieved from https://msdn.microsoft.com/en-us/windows/desktop/dn914237, Retrieved on Jan. 30, 2017, 3 Pages.

"Device Formats", Retrieved from https://msdn.microsoft.com/en-us/library/windows/desktop/dd370811 (v=vs.85).aspx, May 31, 2018, 3 Pages.

"DeviceTopology API", Retrieved from https://msdn.microsoft.com/en-us/library/windows/desktop/dd370809(v=vs.85).aspx, May 31, 2018, 3 Pages.

"Enumerating All Processes", Retrieved from https://msdn.microsoft.com/en-us/library/windows/desktop/ms682623(v=vs.85).aspx, May 31, 2018, 4 Pages.

"Exploring the Windows Vista Audio Engine", Retrieved from https://msdn.microsoft.com/windows/hardware/drivers/audio/exploring-the-windows-vista-audio-engine, Apr. 20, 2017, 4 Pages.

"IAudioClient Interface", Retrieved from https://msdn.microsoft.com/en-us/library/windows/desktop/dd370865(v=vs.85).aspx, Jun. 29, 2018, 3 Pages.

"Loopback Recording", Retrieved from https://msdn.microsoft.com/en-us/library/ms679146.aspx, Retrieved on Jan. 30, 2017, 2 Pages.

"Low Latency Audio—Windows Audio Stack", Retrieved from hhttps://docs.microsoft.com/en-us/windows-hardware/drivers/audio/low-latency-audio, Apr. 20, 2017, 22 Pages.

"Media Support in the Microsoft Windows Real-Time Communications Platform", Retrieved from https://msdn.microsoft.com/en-us/library/ms997607.aspx, Nov. 2001, 7 Pages.

"Total Recorder Developer Edition", Retrieved from http://web.archive.org/web/20100106132541/http:/totalrecorder.com/productfr_trDEV.htm, Retrieved on Jan. 6, 2010, 2 Pages.

"Using the Get-Process Cmdlet", Retrieved from https://technet.microsoft.com/en-us/library/ee176855.aspx, Oct. 22, 2009, 4 Pages.

"Windows.Media.Audio Namespace", Retrieved from https://msdn.microsoft.com/en-us/library/windows/apps/windows.media.audio.aspx, Retrieved from Jan. 30, 2017, 4 Pages.

Benjamin, Jeff, "How to Route Audio for Specific Apps to Different Outputs in OS X", Retrieved from http://www.idownloadblog.com/2014/04/29/how-to-route-audio-for-specific-apps-to-different-outputs-in-os-x/, Apr. 29, 2014, Apr. 29, 2014, 4 Pages.

Breen, Christopher, "Macworld Secrets: Capture Audio with Soundflower", Retrieved from http://www.macworld.co.uk/feature/apple/macworld-secrets-capture-audio-soundflower-3484023/, Sep. 11, 2012, 4 Pages.

"About Media Foundation", *Microsoft Developer Resources, Windows Dev Center*, https://msdn.microsoft.com/en-us/library/windows/desktop/ms696274(v=v s.85).aspx, Accessed on or before: Jan. 30, 2017, 2 pages.

"About WASAPI", *Microsoft Developer Resources, Windows Dev Center*, https://msdn.microsoft.com/en-us/library/windows/desktop/dd371455(v=vs.85).aspx, Accessed on or before: Jan. 30, 2017, 2 pages.

"Architectural Overview", *Microsoft Developer Resources, Hardware Dev Center*, https://msdn.microsoft.com/en-us/windows/hardware/drivers/audio/architectural-overview, Last updated: Jan. 24, 2017, Accessed on or before: Jan. 30, 2017, 5 pages.

"Audio Sessions", *Microsoft Developer Resources, Windows Dev Center*, https://msdn.microsoft.com/en-us/library/windows/desktop/dd370796(v=vs.85).aspx, Accessed on or before: Jan. 30, 2017, 4 pages.

"Capturing a Stream", *Microsoft Developer Resources, Windows Dev Center*, https://msdn.microsoft.com/en-us/library/windows/desktop/dd370800(v=vs.85).aspx, Accessed on or before: Jan. 30, 2017, 5 pages.

"Core Audio Interfaces", *Microsoft Developer Resources, Windows Dev Center*, https://msdn.microsoft.com/en-us/library/windows/desktop/dd370805(v=vs.85).aspx, Accessed on or before: Jan. 30, 2017, 5 pages.

"DirectSound—Windows Vista/Windows 7", *Wikipedia*, https://en.wikipedia.org/wiki/DirectSound#Windows_Vista.2FWindows_7, Last updated: Dec. 13, 2016, Accessed on or before: Jan. 30, 2017, 4 pages.

"Error codes in Device Manager in Windows", *Microsoft Support*, https://support.microsoft.com/en-us/help/310123/error-codes-in-device-manager-in-windows, Last updated: Mar. 4, 2016, Accessed on or before: Jan. 30, 2017, 26 pages.

"IAudioCaptureClient interface", *Microsoft Developer Resources, Windows Dev Center*, https://msdn.microsoft.com/en-us/library/windows/desktop/dd370858(v=vs.85).aspx, Accessed on or before: Jan. 30, 2017, 2 pages.

"IAudioClient::Initialize method", *Microsoft Developer Resources, Windows Dev Center*, https://msdn.microsoft.com/en-us/library/windows/desktop/dd370875(v=vs.85).aspx, Accessed on or before: Jan. 30, 2017, 12 pages.

"Improving Audio Quality in VoIP Conferencing Services", In White Paper of Radisys, Mar. 2009, pp. 1-9.

"Is there a way to reset audio on Windows?", *SuperUser*, http://superuser.com/questions/459871/how-to-reset-audio-on-windows, Published on: Aug. 4, 2012, Last updated: Mar. 4, 2016, Accessed on or before: Jan. 30, 2017, 2 pages.

"Is there a way to restart audio without restarting a Windows 7 computer?", *SuperUser*, http://superuser.com/questions/521955/is-there-a-way-to-restart-audio-without-restarting-a-windows-7-computer, Published on: Dec. 20, 2012, Last updated: Jan. 1, 2014, Accessed on or before: Jan. 30, 2017, 3 pages.

(56) References Cited

OTHER PUBLICATIONS

"Managing the Audio Session", *Microsoft Developer Resources, Windows Dev Center*, https://msdn.microsoft.com/en-us/library/windows/desktop/dd374921(v=vs.85).aspx, Accessed on or before: Jan. 30, 2017, 14 pages.

"The Audio service is not running", *Office Tech Center*, https://social.technet.microsoft.com/Forums/office/en-US/56d0bf26-d5a7-42fd-9b95-d6ba89c53f6e/the-audio-service-is-not-running?forum=w7itproperf, Published on: Nov. 29, 2009, Accessed on or before: Jan. 30, 2017, 26 pages.

"The AudioSrv service is not auto starting. It starts by just simply starting from the Task Manager, but it does not start's automatically." *Microsoft Community*, https://answers.microsoft.com/en-us/windows/forum/windows_vista-pictures/the-audiosrv-service-is-not-auto-starting-it/d28ef94a-b356-4e99-8167-52e1fdb3f2df, Published on: Apr. 14, 2012, Accessed on or before: Jan. 30, 2017, 5 pages.

"User Mode Audio Components", *Microsoft Developer Resources, Windows Dev Center*, https://msdn.microsoft.com/en-us/library/windows/desktop/dd316780(v=vs.85).aspx, Accessed on or before: Jan. 30, 2017, 4 pages.

"User-Mode WDM Audio Components", *Microsoft Developer Resources, Hardware Dev Center*, https://msdn.microsoft.com/en-us/windows/hardware/drivers/audio/user-mode-wdm-audio-components, Last updated: Jan. 24, 2017, Accessed on or before: Jan. 30, 2017, 2 pages.

"WDM Audio Terminology", *Microsoft Developer Resources, Hardware Dev Center*, https://msdn.microsoft.com/en-us/library/windows/desktop/dd371455(v=vs.85).aspx, Last updated: Jan. 24, 2017, Accessed on or before: Jan. 30, 2017, 6 pages.

"Windows Audio Architecture", *Microsoft Developer Resources, Hardware Dev Center*, https://msdn.microsoft.com/en-us/windows/hardware/drivers/audio/windows-audio-architecture, Last updated: Jan. 24, 2017, Accessed on or before: Jan. 30, 2017, 4 pages.

"Windows Multimedia", *Microsoft Developer Resources, Windows Dev Center*, https://msdn.microsoft.com/en-us/library/windows/desktop/dd743883(v=vs.85).aspx, Accessed on or before: Jan. 30, 2017, 2 pages.

Johnstone, Curtis, "A Primer on Lync Audio Quality Metrics", http://blog.insidelync.com/2012/06/a-primer-on-lync-audio-quality-metrics/, Published on: Jun. 28, 2012, 4 pages.

Russinovich, Mark et al., "Chapter 4. Management Mechanisms." In *Windows Internals* (6th Ed.), pp. 277-358. Redmond, WA: Microsoft Press, 2012. http://apprize.info/microsoft/internals/4.html, Accessed on or before: Jan. 30, 2017.

Tsigkogiannis, Ilias, "What's New in Audio for Windows 10," *Microsoft | Developer, driver writing != bus driving*, https://blogs.msdn.microsoft.com/iliast/2016/01/28/whats-new-in-audio-for-windows-10/, Published on: Jan. 28, 2016, Accessed on or before: Jan. 30, 2017, 10 pages.

"International Search Report and Written Opinion Issued in PCT Application No. PCT/US2018/016532", dated Apr. 18, 2018, 15 Pages.

"Non Final Office Action Issued in U.S. Appl. No. 15/427,954", dated Sep. 17, 2018, 18 Pages.

* cited by examiner

FIG. 1 software 180 implementing one or more innovations for automatically detecting and correcting audio system performance issues

AUDIO SYSTEM MAINTENANCE USING SYSTEM CALL MONITORING

BACKGROUND

Many modern computer systems, such as through an operating system running on a computer system, provide for the capturing of audio from an input device (e.g., a microphone or other analog or digital input source) and rendering of audio to an output device (e.g., a speaker, headphone jack, or other analog or digital output, including output to a network). Typical computer systems allow for concurrent access to an audio system by multiple applications or processes. For example, a user may be simultaneously listening to music (e.g., from a file or using a streaming application), playing a computer game, having a conversation (e.g., using voice over Internet Protocol ("VoIP") software), using a web browser to browse web pages having audio content, and streaming audio and/or video (e.g., "gamecasting").

During operation, the audio system may experience performance issues. For example, calls to the audio system may hang or become deadlocked, may have prolonged execution times, or may return errors. These performance issues can result from coding errors, or bugs, in the audio service itself, in the drivers for audio endpoints, including hardware audio devices or other rendering or capture endpoints, or in the code for the application calling the audio system. Performance issues can have other sources. For example, if the audio system does not employ a suitable resource management scheme, multiple requests for the same resource (e.g., a buffer or audio endpoint) may result in a deadlock.

Typically, when a performance issue arises, the performance of the audio system is degraded. A user may choose to ignore the performance issue, or may try to take corrective actions. For example, a user may try to restart a particular application, or the computer system itself. Users with more technical expertise might try to reset or restart the audio service, or an audio endpoint. However, many users lack the technical expertise to appropriately diagnose and correct audio system errors, other than by restarting programs or the computer system. The audio system might not provide, or might not provide in an easily obtainable and interpretable format, information that could be used to diagnose the source of performance issues. Any of the corrective actions a user may take are typically time consuming, disruptive, and frustrating. In addition, it may be some time before a user realizes that there is a performance issue with the audio system.

SUMMARY

In summary, innovations are described for automatically detecting and correcting performance issues in an audio system. For example, calls to the audio system, such as from an application running on a computer system providing the audio system, can be monitored for successful completion, errors, and prolonged execution (e.g., a time to complete the request that exceeds a threshold value). The results of the monitoring can be compared with acceptable performance criteria specified by one or more rules. If a call, or in some cases multiple calls (e.g., a series), does not meet acceptable performance criteria, a corrective action can automatically be applied to improve performance of the audio system. In this way, problems can be detected before performance of the audio system becomes unacceptable for a user, or any period of unacceptable performance can be reduced. In addition, the automatic detection and correction of audio system performance issues can relieve a user from having to manually attempt to fix the performance issue, including determining the source of the performance issue and taking the appropriate corrective action.

According to one aspect of the innovations, a computer system implements an audio system monitoring architecture. The architecture includes an interface coded to receive, from audio applications, calls for services of an audio system. An audio capture/playback manager is included, and is coded to execute the calls for audio system services that have been received through the interface. The architecture includes a performance monitor, which is coded to monitor the execution of the calls for audio system services by the audio capture/playback manager. The architecture further includes a rules store, which is coded to maintain one or more rules. Each of the one or more rules defines criteria for execution of a type of call for an audio system service and a corrective action to be taken if the performance monitor indicates that the criteria are not met.

In another aspect, the disclosed innovations provide a method for automatically correcting performance issues in an audio system. The method includes receiving a request from an application, such as an application being executed on a computer system providing the audio system, for services of the audio system. The request is executed by one or more components of the audio system. Execution of the request is monitored, including measuring execution parameters. The measured execution parameters are compared with criteria specified by a rule associated with the request. A corrective action is caused to be executed if the execution parameters do not comply with the rule.

According to another aspect of the innovations, a call from an application for services of an audio system provided by a computer system is received through an interface. The call has a type determined from multiple different types. From multiple rules associated with at least some of the multiple different types, a rule associated with the type of the call is determined. Each of the multiple rules specifies execution criteria and a corrective action, and the corrective actions differ between at least some of the multiple rules. The call is executed by one or more components of the audio system. Execution of the call is monitored to provide execution parameters. The execution parameters are compared with execution criteria specific by the determined rule. The corrective action specified by the determined rule is caused to be executed if the execution parameters do not comply with the rule.

The present disclosure also includes computing systems and computer readable storage media configured to carry out, or including instructions for carrying out, an above-described method. The various innovations can be used in combination or separately. As described herein, a variety of other features and advantages can be incorporated into the technologies as desired. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Innovations are described for automatically detecting performance issues with an audio system and for automatically applying a corrective action in response to a detected performance issue. An audio playback/routing manager executes (e.g., directly executes or causes to be executed) a call to the audio system received through an interface from an audio application. Execution of the call is monitored by a monitoring component, which can, for example, determine whether the call completed successfully, if the call generated any errors, and the time taken to service the request (e.g., the duration of time between when the call was received and the call was completed, such as execution results being returned to the audio application). A decision engine can compare monitored parameters to criteria specified by one or more rules, such as rules maintained in a rules store. If the decision engine determines that the monitored parameters for the call (or, in some cases, a plurality of calls) do not comply with the rule, a corrective action, which can be specified by the rule or be otherwise associated with a type of the call, can be executed (e.g., directly executed by the audio playback/routing manager, or otherwise caused to be executed by the decision engine).

The disclosed innovations can improve the operation of a computer system by improving performance of the audio system. For example, the severity and duration of performance issues can be reduced. In addition, by automatically detecting and correcting performance issues, a user need not be aware of a performance issue, or need to determine or apply the appropriate corrective action.

The various aspects of the innovations described herein include the following:

Automatic detection of performance issues of an audio system by monitoring calls to the audio system.

Automatic execution of corrective actions when a performance issue is detected.

Applying corrective actions specific to a particular performance issue, which can minimize disruptions to the audio system, audio applications, and a user of the computer system.

The various aspects of the innovations described herein can be used in combination or separately. For example, performance errors can be automatically detected, but a corrective action need not be automatically applied. In some cases, a user can be informed of the performance issue and, optionally, a suggested corrective action. Or, the performance issue can be detected in another manner, and a corrective action can be applied automatically depending on the performance issue identified.

Example Computer Systems

Figure 1:
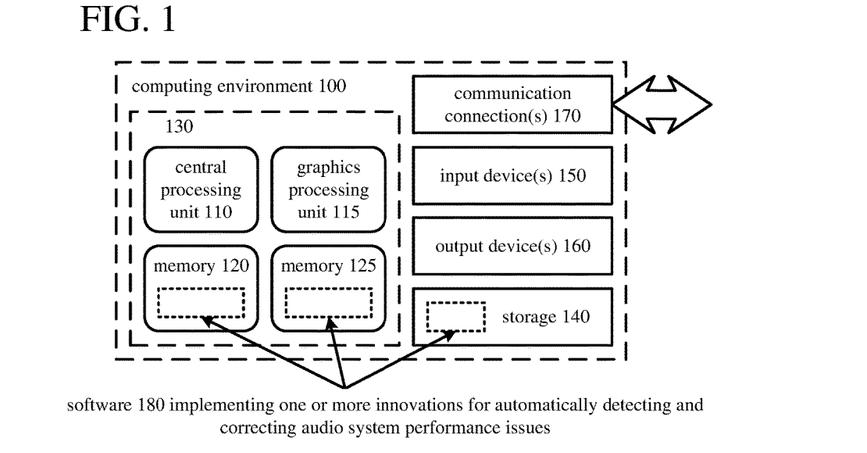
FIG. 1 a block diagram of an example computer system in which some described innovations may be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems. Thus, the computer system can be any of a variety of types of computer system (e.g., desktop computer, laptop computer, tablet or slate computer, smartphone, gaming console, etc.).

With reference to FIG. 1, the computer system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for automatically detecting and correcting performance errors in an audio system, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown), such as a bus, controller, or network, interconnects the components of the computer system (100). Typically, operating system software (not shown) provides an operating environment for other software executing in the computer system (100), and coordinates activities of the components of the computer system (100). In particular, the other software includes one or more audio applications using the services of an audio system provided by the operating system, such as to capture or render audio content. Audio applications can include one or more voice communication applications, such as a stand-alone voice telephony application (VoIP or otherwise), a voice telephony tool in a communication suite, or a voice chat feature integrated into a social network site or multi-player game. The audio applications can also include an audio recording application, a speech-to-text application, or other audio processing software that can use an audio capture feed. Audio applications can also include applications that render audio, for example, to an endpoint, such as media players, games, music production applications, email applications, calendars, contact managers, word processors and other productivity software, Web browsers, and messaging applications.

The tangible storage (140) may be removable or non-removable, and includes magnetic disks, magnetic tapes or cassettes, CD-ROMs, DVDs, or any other medium which can be used to store information and which can be accessed within the computer system (100). The storage (140) stores instructions for the software (180) implementing one or more innovations for automatically detecting and correcting performance errors in an audio system. The storage (140) does not include signals per se.

The input device(s) (150) include one or more audio input devices (e.g., a microphone adapted to capture audio or similar device that accepts audio input in analog or digital form). The input device(s) (150) may also include a touch input device such as a keyboard, mouse, pen, or trackball, a touchscreen, a scanning device, or another device that provides input to the computer system (100). The input device(s) (150) may further include a CD-ROM or CD-RW that reads audio samples into the computer system (100). The output device(s) (160) typically include one or more audio output devices (e.g., one or more speakers). The output device(s) (160) may also include a display, touchscreen, printer, CD-writer, or another device that provides output from the computer system (100).

The communication connection(s) (170) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations of any of the above. None of the computer-readable media herein include signals per se.

The innovations can be described in the general context of computer-executable instructions, such as those included in program modules, being executed in a computer system on a target real or virtual processor. Generally, program modules include routines, methods, programs, libraries, objects, classes, components, data structures, etc. that perform particular tasks or implement particular abstract data types. The functionality of the program modules may be combined or split between program modules as desired in various embodiments. For example, a code module may include code segments to carry out multiple functions. Computer-executable instructions for program modules may be executed within a local or distributed computer system. In various examples described below, a module (e.g., component) is described as being "coded" to perform certain operations or provide certain functionality, indicating that computer-executable instructions for the module can be executed to perform such operations, cause such operations to be performed, or to otherwise provide such functionality.

The terms "system" and "device" are used interchangeably herein. Unless the context clearly indicates otherwise, neither term implies any limitation on a type of computer system or computer device. In general, a computer system or device can be local or distributed, and can include any combination of special-purpose hardware and/or general-purpose hardware with software implementing the functionality described herein.

The disclosed methods can also be implemented using specialized computer hardware configured to perform any of the disclosed methods. For example, the disclosed methods can be implemented by an integrated circuit (e.g., an ASIC such as an ASIC digital signal process unit ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine," "store," "request," "compare," "measure," "monitor," and "send" to describe computer operations in a computer system. These terms denote operations performed by a computer, and should not be confused with acts performed by a human being. The actual computer operations corresponding to these terms vary depending on implementation.

Figure 2:
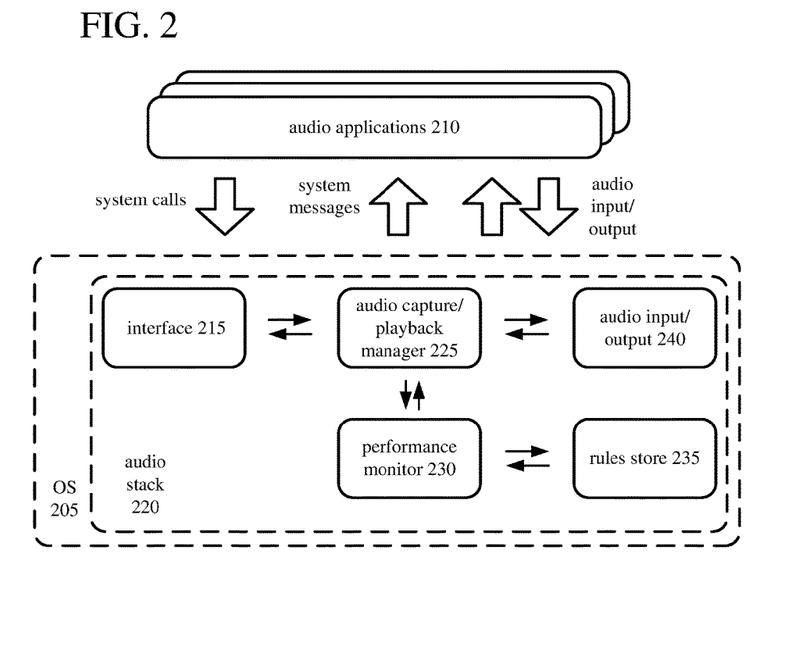
FIG. 2 is a diagram of an example architecture for automatically detecting and correcting performance issues with an audio stack provided by an operating system.

Example Software Architecture for Automatically Detecting and Correcting Audio System Performance Issues FIG. 2 illustrates an example software architecture (200) for managing audio capture and playback for audio applications, and for monitoring the performance of an audio system and automatically executing corrective actions when a performance issue is detected in the audio system. A computer system (e.g., desktop computer, laptop computer, netbook, tablet computer, smartphone) can execute software organized according to the architecture (200) to monitor performance and/or execute corrective actions for one or more audio applications.

The architecture (200) includes an operating system (205) and one or more audio applications (210). An audio application (210) refers to a software application that is capable of, and configured to, provide audio output to the operating system (205) or to an audio endpoint (e.g., a speaker or speaker jack), or which is capable of, and configured to, receive audio input from the operating system or directly from an audio endpoint (e.g., an audio input device, such as a microphone). For example, an audio application (210) can be a voice communication application, such as a standalone voice telephony application (VoIP or otherwise), a voice telephony tool in a communication suite, or a voice chat feature integrated into a social network site or multi-player game. Or, an audio application (210) can be an audio recording application, a speech-to-text application, or other audio processing software that can get an audio capture feed. Or, an audio application (210) can be a playback only application, such as a media player.

During execution, an audio application (210) can make various calls to the operating system (205), such as through an interface (215). Although shown as a single interface, the interface (215) can represent multiple different interfaces. For example, the operating system (205) may provide different interfaces for different functions of the audio system, or may provide different interfaces to provide different levels of control or abstraction to the audio applications (210). That is, some audio applications (210), such as music production applications or real-time communications applications, may wish to have more control over audio capture or playback. A music production application may wish to, for instance, combine various audio streams, or apply effects or processing to one or more audio streams, before application audio is rendered to an endpoint. Other applications, such as Web browsers, games, or media players, may wish to provide more conventional capture or rendering functionality, without having to include significant code for providing such functionality.

As an example, the WINDOWS operating system of Microsoft Corp., of Redmond, Wash., provides multiple application program interfaces (APIs) for its audio system. Higher-level APIs include MEDIA FOUNDATION, WINDOWS MULTIMEDIA, DIRECT SOUND, and DIRECT MUSIC. These higher-level APIs can interface with core APIs, such as the MULTIMEDIA DEVICE (MMDEVICE) API, the WINDOWS AUDIO SESSION API (WASAPI), the DEVICETOPOLOGY API, and the ENDPOINTVOLUME API. Although an application can call the services of the audio system of the operating system (205) using the higher-level APIs, an application can also directly call methods of a core API.

The interface (215) can thus provide a large number of methods that can be called by an audio application (210). As will be further described, calls that hang, have prolonged execution, or result in errors can indicate a problem in an audio stack (220) of the operating system (205). Such calls can include calls to start or stop playback, calls to initialize an audio stream or an audio session (e.g., a collection of one or more audio streams), or calls to read from, or write to, a buffer.

Both the type of call, and a performance issue (e.g., a hang, prolonged execution, or error) encountered during handling of the call by the operating system (205) can relate to a particular underlying problem, and a corrective action that may remedy the problem. For example, if a number of calls hang, a bug may be present in a component of the audio stack (220) responsible for handling the call, or in the audio application (210). The resolution to this problem may be to restart the entire audio system. If calls are completed, but have prolonged execution times compared with a standard response time (or range of standard response times), that may indicate another type of underlying problem. The solution to prolonged execution times may be to restart a particular component of the audio system. In some cases, depending on the type of performance issue encountered, in addition to restarting the audio stack (220), or a component of the audio stack, one or more audio stack components can be reset. That is, execution parameters associated with the component can be reset to an initial or default state. In some cases, such a reset can occur during restart of the entire audio stack (220), or restart of the entire operating system (205) (e.g., rebooting the computer system).

The operating system (205) includes an audio capture/playback manager (225). The audio capture/playback manager (225) can execute (e.g., directly execute, or cause to be executed) operations to establish audio playback (e.g., create audio endpoints and create audio paths between audio applications (210) and the audio endpoints), create audio sessions and streams, and manage audio processing (including muting all or a portion of an audio feed of an audio application or applying effects or other audio processing to all or a portion of an audio feed of an audio application). The audio capture/playback manger (225) can carry out actions in response to calls received through the interface (215). Although shown as a single component, the audio capture/playback manager (225) can be implemented as a plurality of separate components or programs.

Components of the audio capture/playback manager (225) can include an audio engine component that mixes and processes audio streams, including managing (including reading and writing) of buffers. In the audio capture/playback manager (225), an audio service component can be used to setup and control audio streams, as well as to implement operating system (205) audio policies, such as for background audio playback and fading or managing audio levels between different audio streams or audio applications (210) (e.g., "ducking"). The audio capture/playback manager (225) can also include a component to manage audio devices and endpoints.

In some cases, all or a portion of the audio stack (220), including all or a portion of the components of the audio capture/playback manager (225) can be restarted (e.g., stopped and started) or reset (e.g., stopped and started with a modified configuration). These actions can be possible corrective actions, along with corrective actions involving audio endpoints, further discussed below, to address performance issues with the audio stack (220). The performance issues can be detected by a performance monitor (230).

The performance monitor (230) can communicate with the audio capture/playback manager (225). For example, the performance monitor (230) can track the handling of calls to the operating system (205) through the interface (215) (e.g., calls involving the audio stack (220)). The performance monitor (230) can be responsible for detecting or collecting errors involving endpoints, such as hardware or driver errors. The performance monitor (230) also can monitor whether calls through the interface (215) are being completed successfully, and the time taken to complete the respective calls. If an error is detected, or system calls experience prolonged execution times (e.g., taking longer than a threshold time to compete) or are not completing, the performance monitor (230) can direct the audio capture/playback manager (225) to take corrective action, or can report the performance issue to the audio capture/playback manager (or another component) for corrective action.

In determining whether a performance issue exists, and, optionally, what corrective action should be taken to correct a performance issue, the performance monitor (230) can communicate with a rules store (235). The rules store (235) can maintain one or more rules that define (specify) criteria for determining whether a performance issue exists. Typically, a rule will include one or more parameters that are monitored (e.g., measured) and a standard used for determining whether the one or more parameters indicate a performance issue.

For example, a rule may use completion of calls to initialize an audio stream as the monitored parameter. Monitoring may include incrementing a counter for every initialization call that fails or hangs, and decrementing the counter for every initialization call that succeeds. The rule may state that a performance issue exists if the counter meets or exceeds a threshold number. In at least some cases, the rule can be associated in the rule store with a corrective action. For the example of excessive stream initiation call failures, the corrective action may be to restart the audio stack (220).

In some cases, a particular metric, such as a combination of one or more parameters, can be associated with multiple rules, or a particular rule may have multiple possible corrective actions depending on the metric's value. For example, a performance issue may have different levels of severity, including different levels of severity as measured by the metric. If the metric indicates a low-severity problem (e.g., calls complete but have prolonged execution, or few calls are affected), a first, potentially less drastic or disruptive, correction may be applied. For example, a single component of the audio stack (220) may be restarted or reset. If the metric indicates a higher-severity problem (e.g., calls complete but have very prolonged execution, calls do not complete, or a large number of calls are affected), a more drastic or disruptive correction may be applied, such as restarting or resetting the entire audio stack (220).

The operating system (205) includes components for rendering (e.g., rendering visual output to a display, generating audio output for a speaker or other audio endpoint), components for networking, components for processing audio captured from a microphone, and components for managing applications. More generally, the operating system (205) manages user input functions, output functions, storage access functions, network communication functions, and other functions for the computer system. The operating system (205) provides access to such functions to an audio application (210). The operating system (205) can be a general-purpose operating system for consumer or professional use, or it can be a special-purpose operating system adapted for a particular form factor of computer system. In FIG. 2, the audio input/output (240) represents audio capture (e.g., from a microphone or other audio endpoint) or audio routing processing and audio output processing (e.g., the provision of audio content to an audio endpoint). The audio input/output (240) conveys audio data to/from the audio application(s) (210) through one or more data paths, as controlled by the audio capture/playback manager (225) through one or more control paths.

A user can generate user input that affects audio management for voice communication applications and other audio applications. The user input can be tactile input such as touchscreen input, mouse input, button presses or key presses or voice input. For example, a user may initiate or answer a new call in a voice communication application, or terminate a call. Or, the user may move an audio application (210) from the foreground of the UI to the background, or vice versa, or otherwise change the visibility of the application (210). Or, the user may change which application currently has the focus in the UI.

Alternatively, the operating system (205) includes more or fewer modules. A given module can be split into multiple modules, or different modules can be combined into a single module. For example, the audio capture/playback manager (225) can be split into multiple modules that control different aspects of audio management, or the audio capture/playback manager (225) can be combined with another module (e.g., the rules store (235), the performance monitor (230), or the interface (215)). Functionality described with reference to one module can in some cases be implemented as part of another module. Or, instead of being part of an operating system (205), the audio capture/playback manager (225) can be a standalone application, plugin or type of other software.

Figure 3:
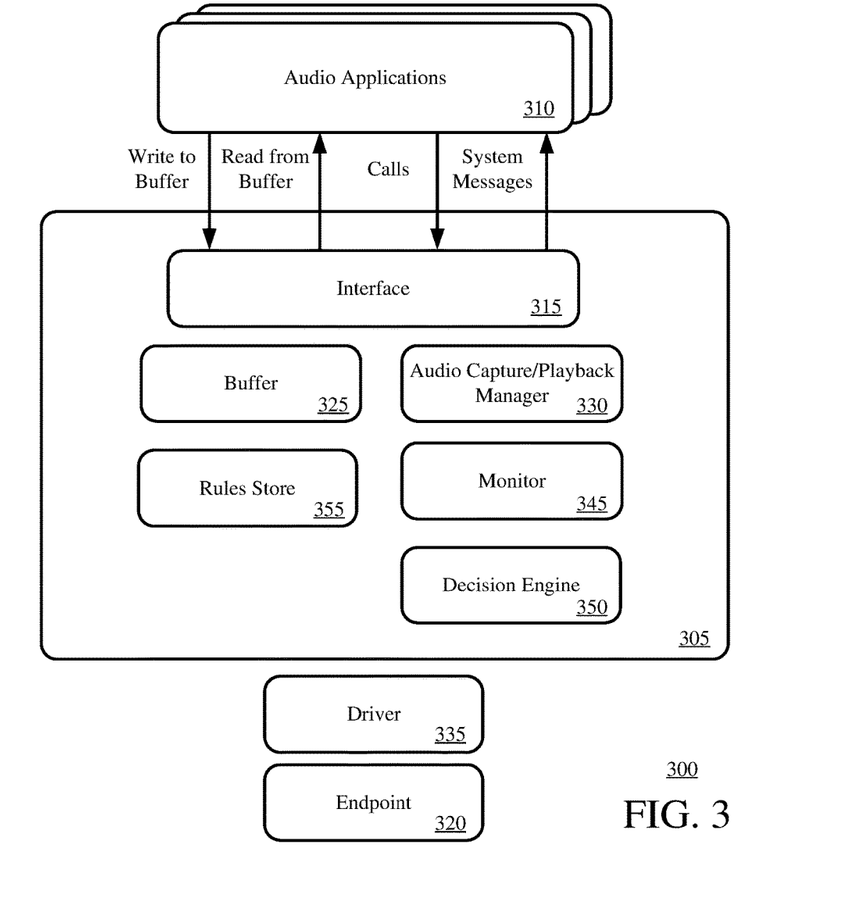
FIG. 3 is a diagram of an example architecture providing further details of an audio stack that can be used to automatically detect and correct performance issues.

Example Architecture Including Audio Stack Components for Automatically Detecting and Correcting Audio System Performance Issues FIG. 3 illustrates an example architecture (300) whereby an audio stack (305) (e.g., implementing audio system services provided by an operating system, such as the operating system (205) of FIG. 2) can be monitored for performance issues, and any detected performance issues can be automatically corrected.

The architecture includes a plurality of audio applications (310). The audio applications (310) can send data to, and receive data from, the audio stack (305). Data sent from an audio application (310) to the audio stack (305) can include calls to the audio stack (305) through an interface (315) (which may be for example, the interface (215) of FIG. 2).

The data sent from the audio application (310) to the audio stack (305) can also include data representing audio content, such as audio content to be rendered to an audio endpoint (320). In some cases, the audio content data can be sent to a buffer location (e.g., a particular buffer (325) and a particular position within the buffer) indicated by the audio stack (305) in response to a call by an audio application (310) through the interface (315).

Data that an audio application (310) can receive from the audio stack (305) can include responses to calls to the interface (315) made by the audio application (310) and other system messages. For example, in response to a request to read data from, or write data to, a buffer for an audio stream, the audio stack (305) may return to the calling audio application (310) a location for a corresponding buffer (325), including a particular location within the buffer. System messages can include error messages associated with calls through the interface (315), or otherwise related to the operation or performance of the audio stack (305).

The interface (315) can provide calls from an audio application (310) to an appropriate component of the audio stack (305), such as an audio capture/playback manager (330). In at least some aspects, the audio capture/playback manager (330) can be configured as described for the audio capture/playback manager (225) of FIG. 2. The audio capture/playback manager (330), or a particular component thereof, can be responsible for various tasks, including:

routing audio content to a driver (335) to be rendered at an audio endpoint (320), including routing through an appropriate buffer (325);

routing audio content from an endpoint (320) to an audio application (310), including routing through an appropriate buffer (325);

initializing and managing audio streams;

creating and managing buffers (325), including tracking buffer sizes, buffer assignments (e.g., what audio stream is associated with a particular buffer), and buffer positions;

initializing and managing audio sessions (e.g., collections of one or more audio streams);

mixing audio streams, including mixing multiple streams to be rendered at a particular audio endpoint (320);

applying effects (e.g., reverb, echo, flange) to audio streams;

monitoring and adjusting volume levels of audio streams, including in response to activity at the computer system on which the audio stack (305) is operating, such as audio "ducking" in response to user actions, such as changing what application has the focus of the UI (e.g., is currently active, in the foreground, or has the highest priority);

initializing, monitoring, and removing drivers (335); and adding and removing audio endpoints (320) to or from the audio stack (305).

At least a portion of the tasks described above can be carried out in response to a call from an audio application (310) through the interface (315). The execution of the calls can be monitored by a monitoring component (345) (for example, the performance monitor (230) of FIG. 2). The monitoring component (345) can track individual calls to determine whether the calls complete successfully, how long the calls take to complete, and whether the calls generate or return any errors.

Information gathered by the monitoring component (345) can be provided to, or accessed by, a decision engine (350). The decision engine (350) can compare the call execution metrics to one or more rules of a rules store (355), which can be the rules store (235) of FIG. 2. As described above, the rules store (355) can maintain one or more rules that define criteria for when the call execution metrics may indicate a performance issue, as well as a corrective action to be taken to mitigate a performance issue.

If a call produces an error code, the error code can be associated with a corrective action. For example, one or more error codes may indicate a problem with a driver (335) for an endpoint (320). If the error code is detected by the monitoring component (345), the decision engine (350) can compare the code to one or more rules in the rule store (355) and cause the indicated corrective action to be taken. In the case of a problem with a driver (335), the driver may be uninstalled and reinstalled. Or, the decision engine (350) can cause a search for a new or updated driver to be initiated. If a new or updated driver is detected, it can be installed as the new driver (335). In some cases, if a new or updated driver is not detected, the existing driver can be uninstalled and reinstalled.

Calls that do not complete, or that are delayed compared with a normal response time, can indicate a problem within a component of the audio stack (305) or an audio application (310). In some cases, a resource management issue may cause a race condition or deadlock to occur, resulting in one or more uncompleted calls, or calls that return errors or erroneous results. Uncompleted calls can also result from code errors, or bugs, in a component of the audio stack (305) or an audio application (310). The audio stack (305) may be able to continue to provide acceptable performance if the number of uncompleted calls is lower than a threshold amount. However, an increased number of uncompleted calls can indicate a more serious problem with the audio stack (305). The larger number of uncompleted calls may negatively affect the performance of the audio stack (305), such as causing recording or playback errors, or causing recording or playback to stop.

Accordingly, the rules store (355) can maintain one or more rules defining one or more situations involving uncompleted calls that may result in the audio stack (305) automatically taking action to correct the problem. In some cases, the number of uncompleted calls, such as the number of uncompleted calls over a time period, or the number of consecutive uncompleted calls, can be used to determine whether a performance issue exists, and potentially its severity. If the number of uncompleted calls exceeds one or more threshold values, different corrective actions, such as restarting the entire audio stack (305) or restarting a component of the audio stack, can be applied. In other cases, the number of uncompleted, or hung, calls can be analyzed in another manner to determine whether a performance issue may exist. In a particular example, the calls can be analyzed using a counter that is incremented when a call hangs and is decremented when a call completes successfully, such as:

```
if (!callComplete)
    {
        callCounter++;
    }
else
    {
        callCounter--;
    }
if (callCounter >= maxThreshold)
    {
        restartAudioStack( );
        return statusError;
    }
```

```
else
    {
        return statusNormal;
    }
```

Even if calls complete, if their execution is sufficiently prolonged compared to a normal service time or time range, performance of the audio stack (305) may suffer, and may drop below an acceptable level. The monitoring component (345) can track the number of calls with prolonged execution, the amount of delay, the type of call having prolonged execution, or combinations thereof. Rules can be defined based on these factors, with a larger number of calls with prolonged execution, or greater delay period, typically indicating more serious problems with the audio stack (305) or requiring more drastic corrective actions.

A rule can use a single criterion, such as threshold number of calls with prolonged execution times or a threshold delay duration, and a single threshold, or can use multiple criteria, multiple thresholds, or a combination thereof. For example, a rule (or multiple rules) can take a first corrective action if a first threshold is exceeded, and a second corrective action if a second threshold is exceeded. Or, a rule can take a corrective action if the number of calls with prolonged execution times exceeds a first threshold and the delay (such as the average delay) exceeds a second threshold.

The type of call that is delayed or uncompleted or hung can be related to the corrective action to be taken. As described above, the audio capture/playback manager (330) can include multiple components. If the call is directed to a particular component, in some cases, the corrective action can be restarting or resetting that particular component. For other types of calls (including calls to particular components of the audio capture/playback manager (330), the corrective action can be to reset or restart the audio stack (305). Or, if the call involves a driver (335) or an endpoint (320), the corrective action can be to update or reinstall the driver (335), or to remove and re-add the endpoint (320).

Further examples of errors that may be encountered, and potential corrective actions, include:

| Error | Corrective Action(s) |
| --- | --- |
| Device configuration error | Update/reinstall driver |
| Corrupted device driver | Reinstall driver |
| Inadequate system resources (e.g., memory) | Close some applications/terminate some processes |
| Device cannot be started | Update/reinstall driver |
| Device conflict | Disable one of the conflicting devices |
| Service/system restart required | Restart service/system |
| Additional system resources needed for device | Assign additional system resources |
| Device driver needs to be reinstalled | Update/reinstall driver |
| Device configuration information incomplete or corrupted | Reinstall driver |
| | Revert to prior configuration |
| Operating system is removing device | Retry operation |
| | Restart computer system/service |
| Device disabled | Enable device |
| Device not present or no driver installed | Update/reinstall device driver |
| | Remove/add device |
| Device driver cannot be loaded | Update device driver |
| Device driver disabled or alternative driver being used | Uninstall/reinstall driver |
| | Change driver start type |
| Cannot initialize driver | Uninstall/reinstall driver |
| Cannot load driver because previous | Restart computer system/ |

| Error | Corrective Action(s) |
|---|---|
| instance in memory | service |
| Driver loaded, but device not found | Update/reinstall driver |
| Device shut down by application or service | Restart computer system/service |
| Device prepared for removal but not removed | Restart computer system/service |

Figure 4:
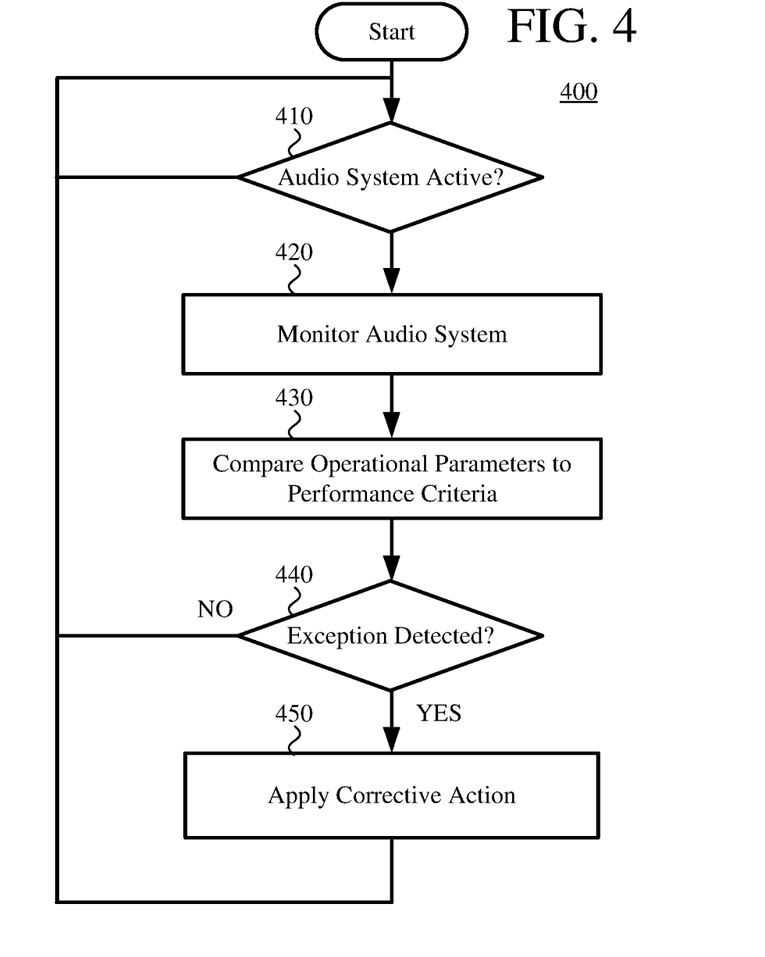
FIG. 4 is a flowchart of operations occurring during monitoring and correcting audio system performance issues according to a generalized example innovation of the present disclosure.

Process for Automatically Detecting and Correcting Audio System Performance Issues FIG. 4 is a flowchart of operations (400) occurring during the detection and automatic correction of a performance issue in an audio system (e.g., the audio stack (305) of FIG. 3 or the audio stack (205) of FIG. 2). The operations (400) can be implemented in a single component (e.g., a single component of an audio system) or in multiple components (e.g., using two or more of the rules store (355), decision engine (350), monitor (345), and audio capture/playback manager (330)).

At (410), it is determined whether the audio system is active. For example, it can be determined whether audio applications are issuing calls to the audio system, or are capturing or rendering audio content. If no audio is being rendered or captured, the operations (400) wait at (410) until the audio system is active (shown as the "NO" branch from the decision (410)). If the audio system is active (shown as the "YES" branch from the decision (410)), the audio system is monitored at (420). For example, a call to the audio system can be monitored for one or more of completion of the call, time taken to complete the call, and errors produced during call execution.

At (430) the operational parameters of the audio system monitored at (420) are compared with performance criteria. The performance criteria may be specified by one or more rules, such as whether the number of uncompleted calls (e.g., up to and including the current call), or the service time for calls (e.g., up to and including the current call), exceeds a threshold, which is implementation-dependent. It is determined at (440) whether an audio system exception exists, such as a violation of a rule specifying performance criteria. If an exception does not exist (shown as the "NO" branch from the decision (440)), the operations (400) return to (410), including monitoring the audio system at (420) if the audio system is still active. If an exception exists (shown as the "YES" branch from the decision (440)), a corresponding corrective action is applied at (450). For example, all or a portion of the audio system may be reset or restarted, an endpoint may be restarted (e.g., the drivers reinstalled, and optionally updated), or an endpoint device may be removed and re-added. The operations (400) can then return to (410).

Example Operations for Audio System Monitoring and Correction

Figure 5:
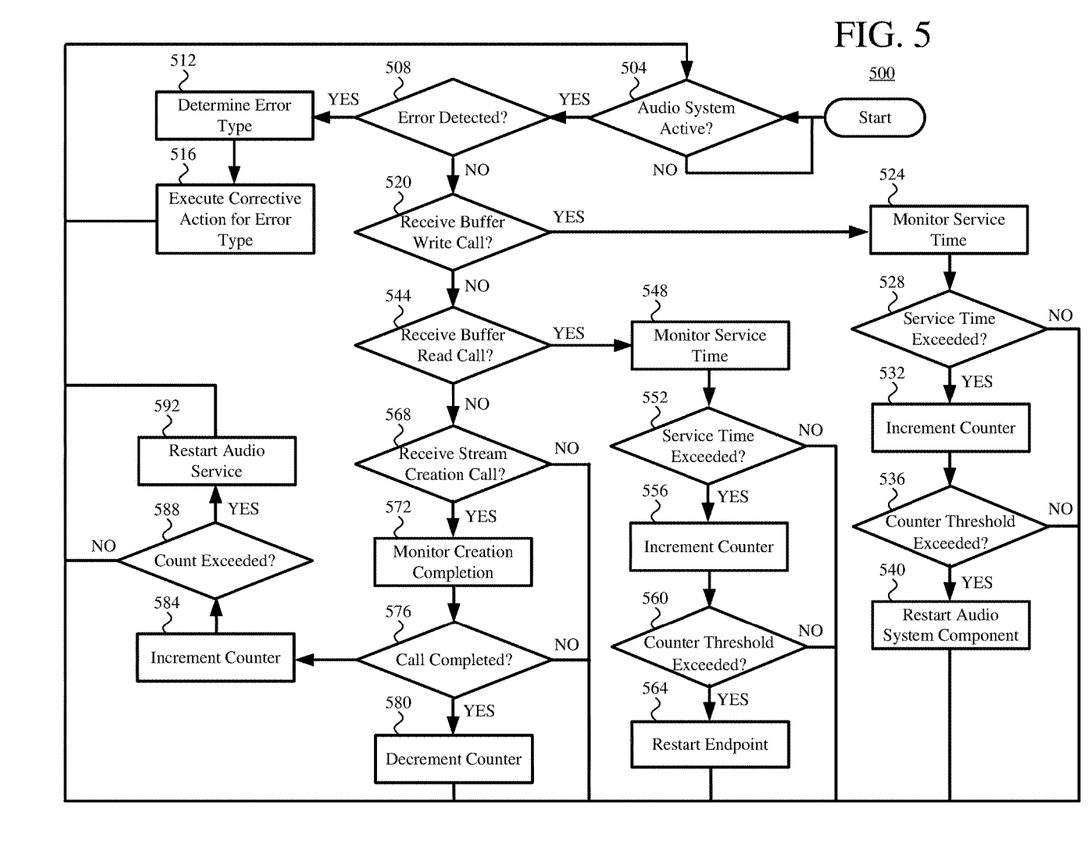
FIG. 5 is a flowchart of operations occurring during an example approach to automatically detecting and correcting performance issues associated with an audio system.

FIG. 5 is a flowchart of operations (500) occurring during the detection and automatic correction of a performance issue in an audio system (e.g., the audio stack (305) of FIG. 3 or the audio stack (220) of FIG. 2) for an example implementation. The operations (500) can be implemented in a single component (e.g., a single component of an audio system) or in multiple components (e.g., using two or more of the rules store (355), decision engine (350), monitoring component (345), and audio capture/playback manager (330)).

The operations (500) describe specific calls to be monitored for performance issues, particular criteria for determining whether a performance issue exists, and particular corrective actions to be taken if a performance issue exists. The operations (500) are provided as a specific example of how the disclosed innovations can be applied. However, the innovations are not limited to the specific operations (500) of FIG. 5.

Various counters used to track system performance are initialized, including a write service time counter, read service time counter, and stream start counter, which are further explained below. At (504), it is determined whether the audio system is active. For example, it can be determined whether any audio applications are sending calls to the audio system, or whether any audio applications are capturing audio content from, or rendering audio content to, an audio endpoint. If the audio system is not active (shown as the "NO" branch from the decision (504)), the operations (500) can loop at (504) until the audio system becomes active.

If the audio system is active (shown as the "YES" branch from the decision (504)), the operations (500) can check a number of conditions to determine whether a performance issue exists. Checking the conditions can include comparing a measured value of a parameter of the audio system to a threshold (e.g., standard or default value) and determining whether the parameter value is within normal limits. A corrective action can be applied if the parameter value is not within normal limits.

At (508), it is determined whether an error has been detected. For example, a component of the audio system, a driver, an endpoint, or another component in communication with the audio system can report an error, for example, when executing a call to the audio system or otherwise carrying out audio system operations. If an error is detected, at (512), the error type is determined, such as if the error is associated with a particular endpoint, driver, or audio system component. At (516), a corrective action is applied that corresponds to the error type, such as a corrective action indicated by a rule associated with the error type determined at (512). Example corrective actions can include adding or removing an audio hardware device, updating or reinstalling a driver for an audio endpoint, restarting or resetting a component of the audio system, or restarting or resetting the audio system. Once the corrective action has been automatically been executed at (516), the operations (500) return to (504).

If an error was not detected at (508), the operations (500) proceed to (520), where it is determined if a call to write to an audio buffer was received. If a buffer write call was received, the time taken to complete the call, or service time, can be monitored at (524). Monitoring the service time can include monitoring whether the call successfully completes, or becomes deadlocked or hangs. Monitoring the service time can also include monitoring for errors. At (528), it is determined whether a target service time has been exceeded (which can include determining whether the call completed successfully but took longer than the target service time, or became deadlocked or hung). If the target service time is not exceeded, the operations (500) can return to (504). In some cases, if the target service time was not exceeded, prior to returning to (504), a write service time counter related to the number of calls with prolonged execution times can be decremented.

If the target service time was determined at (528) to have been exceeded, the write service time counter, which can track the number of calls having prolonged execution times in writing to an audio buffer (including deadlocks, etc.), can be incremented at (532). At (536), it is determined whether a threshold for the write service time counter has been exceeded. In at least some cases, the threshold can be defined as a number of prolonged execution times over a particular time period. The threshold for the write service time counter can be determined, or defined, in another manner, including analyzing the average delay, or total delay, over a time period.

If the threshold for the write service time counter is not exceeded, the operations (500) return to (504). If the threshold for the write service time counter is exceeded, a component of the audio system, such as a component responsible for managing audio buffers, is restarted or reset at (540). Or, depending on the architecture of the audio system, another component can be reset or the entire audio system can be restarted or reset. At this point, the write service time counter can be reset (e.g., set to zero). The operations (500) then return to (504).

Returning to (520), if a buffer write call was not received, it is determined at (544) whether a call to read an audio buffer was received. If a call to read an audio buffer was received, the time to service the call is monitored at (548), which can include determining whether the call completed successfully, was deadlocked or hung, or generated any errors. At (552), it is determined whether a target service time, such as specified by a rule, was exceeded (which can included determining whether the call completed successfully or became deadlocked or hung). If the target service time was not exceeded, the operations (500) can return to (504). In some cases, if the target service time was exceeded, prior to returning to (504), a read service time counter related to the number of calls with services times exceeding a threshold can be decremented.

If the target service time was determined at (552) to have been exceeded, the read service time counter, which can track the number of calls to read from an audio buffer having prolonged execution times, can be incremented at (556). At (560), it is determined whether a threshold for the read service time counter had been exceeded. In at least some cases, the threshold can be defined as a number calls having prolonged read service times over a particular time period. The threshold for the read service time counter can be determined, or defined, in another manner, including analyzing the average delay, or total delay, over a time period.

If the threshold for the read service time counter is not exceeded, the operations (500) return to (504). If the threshold for the read service time counter is exceeded, the audio endpoint associated with the call to read from an audio buffer (e.g., an endpoint providing audio content to the buffer) can be reset at (564). For example, a driver associated with the endpoint can be updated, or reinstalled. Or, a hardware device associated with the endpoint can be removed and readded. Or, depending on the architecture of the audio system, a component of the audio system (e.g., a component that managers audio buffers), or the entire audio system, can be restarted or reset. At this point, the read service time counter can be reset (e.g., set to zero). The operations (500) then return to (504).

Returning to (544), if a buffer read call was not received, it is determined at (568) whether a call to create or initialize an audio stream was received. If a call to create or initialize an audio stream was not received, the operations (500) can return to (504). However, in some aspects, the operations (500) can determine whether other types of audio system calls were received, determine whether they comply with a rule, and, if a rule is violated, automatically apply a corrective action.

If, at (568), it is determined that a call to create or initialize an audio stream was received, the call is monitored at (572). At (576), it is determined whether the call completed, or if the call became deadlocked or hung. If the call completed successfully, a stream start counter can be decremented at (580), and the operations (500) return to (504). If the call did not complete, or became deadlocked or hung, the stream start counter can be incremented at (584). At (588), it is determined whether the stream start counter exceeds a threshold. If the threshold for the stream start counter is not exceeded, the operations (500) return to (504). If it is determined at (588) that the counter exceeds the threshold for the stream start counter, the audio service can be reset or restarted at (592). Or, depending on the architecture of the audio system, other corrective actions may be taken. For example, a component of the audio system responsible for stream creation or management may be restarted or reset. At this point, the stream start counter can be reset (e.g., set to zero).

Various changes may be made to the operations (500) without departing from the scope of the disclosed innovations. For example, in some aspects, the operations (500) can include tracking the results of corrective actions. If a corrective action is taken, and a problem persists, the rule, or corrective action specified by a rule, can change. For instance, if restarting a component of the audio system, or resetting an audio endpoint, does not correct a performance issue, continued performance issues can result in the entire audio system being reset or restarted.

Figure 6:
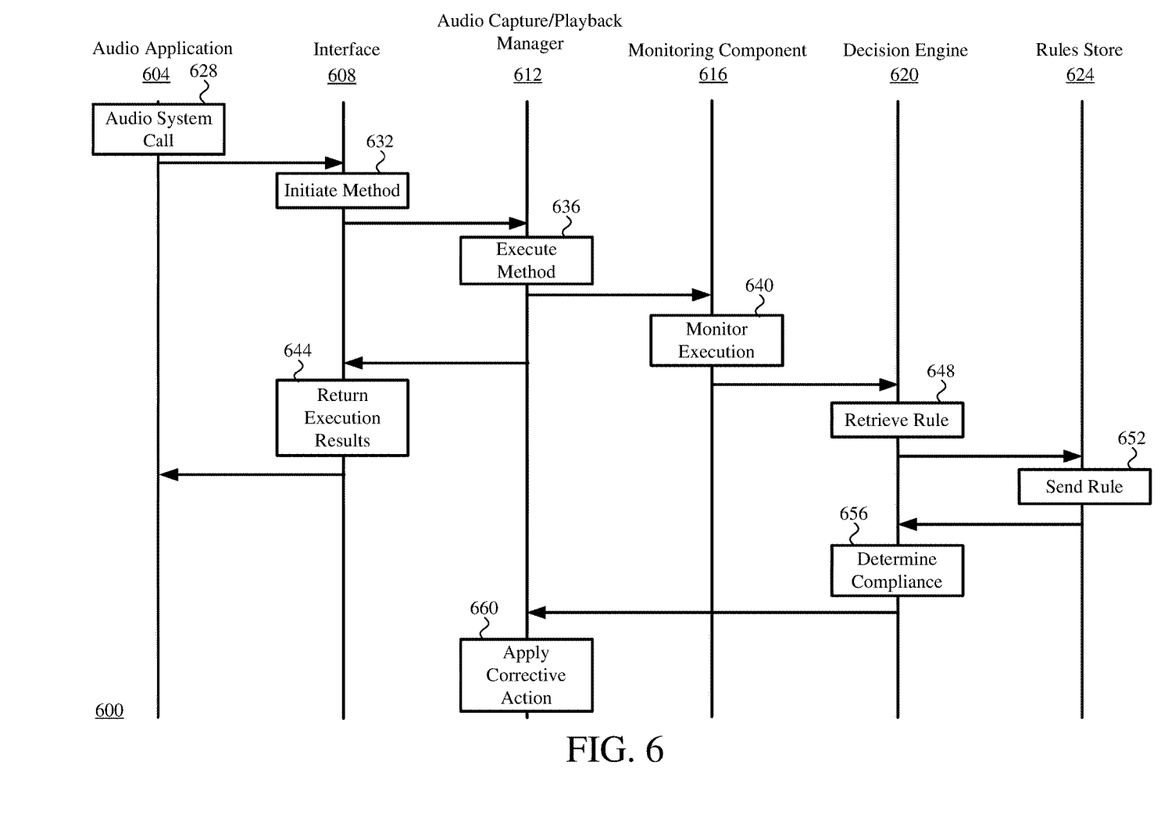
FIG. 6 is a diagram illustrating the interaction of an audio application and audio system components during execution of a call to the audio system, and automatic detection and correction of performance issues associated with call execution.

Interaction of Audio System Components During Automatic Detection and Correction of Audio System Performance Issues FIG. 6 depicts operations (600) occurring at an audio application (604), an audio system interface (608), an audio capture/playback manager (612), a monitoring component (616), a decision engine (620), and a rule store (624) in a disclosed method for automatically applying a corrective action to an audio system when a performance issue is detected by monitoring calls to the audio system. The operations can be implemented, for example, using the components of the architecture (300) of FIG. 3.

At (628), the audio application (604) issues a call to the audio system through the interface (608). The call can be, for example, a call to create or initialize an audio stream, to read from an audio buffer, to write to an audio buffer, or for another type of service provided by the audio system. After receiving the call, at (632), the interface (608) initiates the method called by the audio application (604). For example, the interface (608) may cause the audio capture/playback manager (612) to execute the method at (636).

While the method is being executed by the audio capture/playback manager (612), the execution can be monitored by the monitoring component (616) at (640). For example, the monitoring component (616) can determine whether the method executed successfully, the time taken to service the call, and whether any errors were generated during execution.

Execution results can be returned to the audio application (604) through the interface (608) at (644). The monitoring results can be provided to the decision engine (620). At (648), the decision engine (620) requests one or more rules associated with the call made by the audio application (604)

from the rules store (624). The rules store (624) sends the appropriate rule(s) to the decision engine (620) at (652). At (656), the decision engine (620) determines whether the monitoring results indicate that the system call was executed in compliance with the one or more rules. The compliance results are returned to the audio capture/playback manager (612). If the results indicate that call execution did not comply with a rule, the audio capture/playback manager (612) applies a corrective action at (660). For example, the audio capture/playback manager (612) may restart an audio endpoint, remove and add a hardware device, restart or reset a component of the audio system, or restart or reset the entire audio system.

Figure 7:
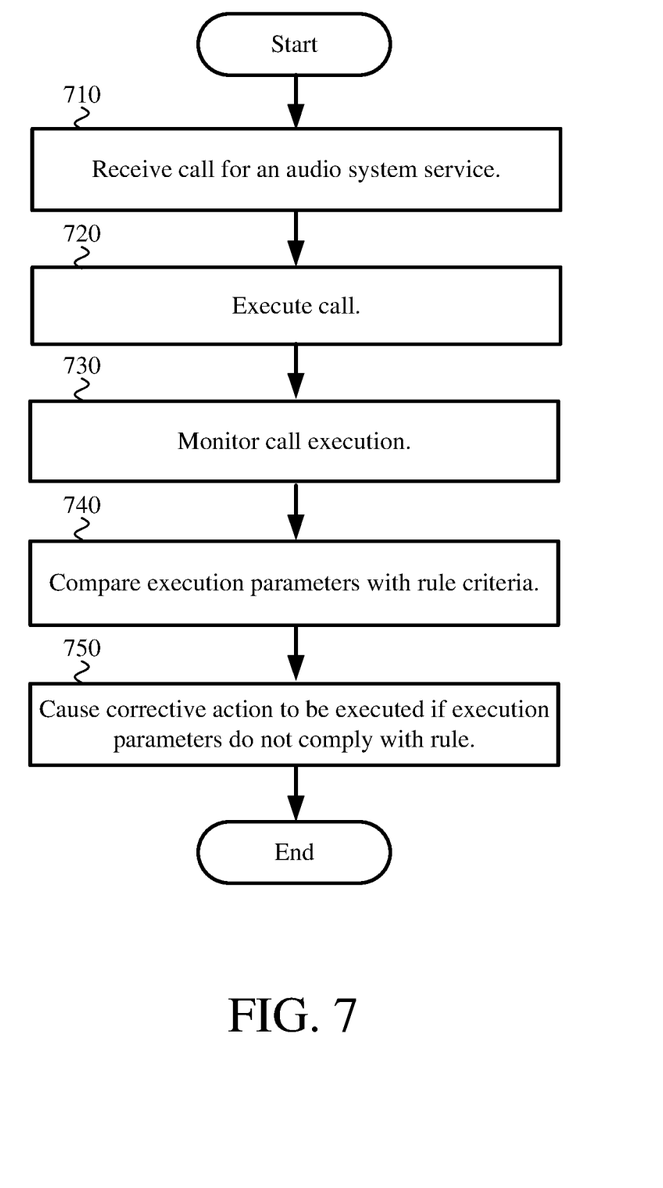
FIG. 7 is a flowchart illustrating a generalized approach by an audio system to automatically detect and correct performance issues associated with calls to the audio system for audio system services.

Generalized Operations for Automatically Detecting and Correcting Audio System Performance Issues FIG. 7 is a flowchart of operations (700) occurring at an audio system, such as the audio stack (220) of FIG. 2 or the audio stack (305) of FIG. 3, during monitoring of the audio system for performance issues and automatic correction of any detected performance issues. At (710), a call, or request, for an audio system service is received, such as through an interface. In particular aspects, the call is received from an application running on the same computer system that operates the audio system. In other aspects, the audio application can be located on another computer system. For example, the call may be a remote procedure call. In any case, the call has a type determined from multiple different types. A rule, associated with the type of the call, is determined from among multiple rules associated with at least some of the multiple different types, respectively. For example, a call may be associated with a type, and the call type may be associated with one or more rules. Each of the multiple rules specifies execution criteria and a corrective action. The corrective actions can differ between at least some of the multiple rules.

The call, or request, is executed at (720). Call execution is monitored at (730), providing execution parameters describing the execution of the call. Monitoring call execution can include determining whether a call completes successfully or enters into a deadlock condition or otherwise hangs. Monitoring call execution can also include monitoring the time taken to service a call, or determining whether call execution (or attempted execution) results in any errors.

At (740), the monitored execution parameters are compared with criteria specified by the determined rule associated with the call. Comparing execution parameters with rule criteria can include determining whether a value of an execution parameter exceeds a value specified by the rule criteria. A corrective action is caused to be executed at (750) if the execution parameters are determined not to comply with the rule. Corrective actions can include restarting or resetting the audio system, restarting or resetting a component of the audio system, or restarting an audio endpoint.

ALTERNATIVES AND VARIATIONS

Various alternatives to the foregoing examples are possible.

Although the operations of some of the disclosed techniques are described in a particular, sequential order for convenient presentation, it should be understood that this manner of description encompasses rearrangement, unless a particular ordering is required. For example, operations described sequentially may in some cases be rearranged or performed concurrently. Also, operations can be split into multiple stages and, in some cases, omitted.

The various aspects of the disclosed technology can be used in combination or separately. Different embodiments use one or more of the described innovations. Some of the innovations described herein address one or more of the problems noted in the background. Typically, a given technique/tool does not solve all such problems.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method for automatically correcting performance issues in an audio system, the method comprising:
    receiving a request from an application executing on the computer system for services of the audio system in conjunction with routing audio content between the application and an audio endpoint;
    executing the request from the application;
    monitoring the execution of the request from the application, wherein the monitoring comprises measuring execution parameters determined during the monitoring of the execution of the request from the application, wherein the execution parameters comprise one or more of determining whether the request completed successfully, determining whether the request generated any errors, or determining a time taken to service the request;
    determining a request type for the request from the application;
    comparing the execution parameters with criteria specified by a rule associated with the request type, the criteria comprising one or more of a number of unexecuted requests of the request type, a number of requests of the request type that generated errors, a number of requests of the request type whose execution did not satisfy a threshold set in the rule, or an amount by which a time taken to service the request exceeded a threshold set in the rule; and causing a corrective action to be executed if the execution parameters do not comply with the rule.

2. The method of claim 1, wherein the request is a request to initialize an audio stream, the monitoring comprises determining whether a call completes, hangs, or deadlocks, and the method further comprises:

incrementing a counter if the call hangs, deadlocks, or otherwise does not complete; and decrementing the counter if the call completes;

wherein the comparing the execution parameters with criteria specified by the rule associated with the request comprises comparing the counter with a threshold value; and wherein the execution parameters do not comply with the rule if the counter exceeds the threshold value.

3. The method of claim 1, wherein the execution parameters track performance of a component of the audio system and the corrective action comprises restarting the component.

4. The method of claim 1, wherein the execution parameters track performance of a component of the audio system and the corrective action comprises resetting the component.

5. The method of claim 1, wherein the execution parameters track performance of the audio endpoint and the corrective action comprises resetting the audio endpoint.

6. One or more computer-readable media storing computer-executable instructions for causing a computer system, when programmed thereby, to perform operations comprising:

receiving, through an interface, a call from an application for services of an audio system of the computer system in conjunction with routing audio content between the application and an audio endpoint, the call having a type determined from a plurality of different types, the plurality of types comprising a type indicating a request to read from a buffer associated with an audio stream and a type indicating a request to write to a buffer associated with an audio stream;

determining, from among a plurality of rules associated with at least some of the plurality of different types, respectively, a rule associated with the type of the call, wherein each of the plurality of rules specifies execution criteria and a corrective action, and wherein the corrective actions differ between at least some of the plurality of rules;

executing the call;

monitoring the call during execution of the call to provide execution parameters, the execution parameters comprising one or more of whether the call completed successfully, whether the call generated any errors, or a time taken to complete the call;

comparing the execution parameters for the call with the execution criteria specified by the determined rule, the execution criteria for the determined rule comprising one or more of a number of unexecuted requests of the request type, a number of requests of the request type that generated errors, a number of requests of the request type whose execution did not satisfy a threshold set in the rule, or an amount by which a time taken to service the request exceeded a threshold set in the rule; and causing the corrective action specified by the determined rule to be executed if the execution parameters do not comply with the rule.

7. The method of claim 1, wherein the request from the application is a request to read from, or write to, an audio buffer for the application.

* * * * *